United States Patent [19]

Badoureaux

[11] Patent Number: 4,722,558
[45] Date of Patent: Feb. 2, 1988

[54] PRONGED FITTING

[75] Inventor: Jean-Pierre Badoureaux, Annemasse, France

[73] Assignee: Parker Hannifin RAK, SA, Annemasse, France

[21] Appl. No.: 881,166

[22] Filed: Jul. 2, 1986

[30] Foreign Application Priority Data

Jul. 2, 1985 [FR] France .................. 85 10598

[51] Int. Cl.$^4$ .................................. F16L 21/08
[52] U.S. Cl. ...................... 285/39; 285/242; 285/340
[58] Field of Search .......... 285/340, 323, 242, 39

[56] References Cited

U.S. PATENT DOCUMENTS

| 4,123,090 | 10/1978 | Kotsakis et al. | 285/340 X |
| 4,146,254 | 3/1979 | Turner et al. | 285/340 X |
| 4,593,943 | 6/1986 | Hama et al. | 285/340 X |

FOREIGN PATENT DOCUMENTS

| 1486671 | 9/1977 | United Kingdom | 285/340 |
| 2060106 | 4/1981 | United Kingdom | 285/340 |

Primary Examiner—Thomas F. Callaghan
Attorney, Agent, or Firm—Joseph B. Balazs

[57] ABSTRACT

This fitting has a transverse bore (3) and, at one of its ends, a male or female threaded end to connect it immovably to one of the two parts to be joined by means of tube (6) and, at its other end, a ring-shaped chamber (5) which is coaxial to bore (3) and which, in addition to a ring-shaped watertight joint (9) and a retaining collar (8), houses a ring-shaped member (7) which has prongs (7a) slanted toward the rear (5a) of chamber (5) and pro-jecting radially into chamber (5), thus delimiting an inside diameter normally smaller than the outside diameter of the connecting tube, the purpose of this chamber (5) being to receive and retain one of the ends of tube (6) simply by inserting it to the rear (5a) of the chamber and the inside and outside diameters of chamber (5) corresponding approximately to the outside diameter of tube (6), while the outside diameter is greater than the outside diameter of tube (6) to make it possible to house the ring-shaped joint (9), the pronged member (7) and the retaining collar (8), and within which the ring-shaped pronged member is associated with a ring-shaped support (11) having an outer ring (11a) of the same outside diameter as ring-shaped pronged member (7) and an inner tubular part that has an inside diameter normally equal to or slightly greater than the outside diamter of connecting tube (6) and of which the free edge is oriented toward prongs (7a) of the pronged member (7) for the purpose of limiting, while serving as support for their swing in the direction of penetration into the wall of the tube.

The inner tubular part is formed of tabs (11b) connected to ring (11a) mentioned above by their heel-shaped part (11c) curved radially outward.

6 Claims, 6 Drawing Figures

PRONGED FITTING

The present invention concerns a pronged fitting for flexible or rigid tubing possibly equipped with an external ring-shaped neck, i.e., a fitting of the type having a transverse bore and, at one end, a male or female threaded end for connecting it immovably to one of the two parts to be joined by means of this tube and, at the other end, a ring-shaped chamber coaxial to its bore, which houses, in addition to a ring-shaped watertight joint and a retaining collar partially closing the ring-shaped chamber, and in an area near the midpoint, a ring-shaped member having prongs slanted toward the rear of the ring-shaped chamber and projecting radially into the interior of the chamber from the outer wall, delimiting an inside diameter normally smaller than the outside diameter of the connecting tube, the purpose of this chamber being to receive and retain one of the ends of the connecting tube simply by inserting it all the way to the rear of the chamber, and the inside diameter of the chamber corresponding to the inside diameter of the tube, while its outside diameter is greater than the outside diameter of the tube in order for it to be able to house the watertight joint, the member with the prongs and the retaining collar.

The purpose of slanting the prongs toward the rear of the ring-shaped chamber is to facilitate the insertion of the tube and to prevent its removal since a recessive motion of the tube effects a swinging of the prongs causing them to penetrate the wall of the tube.

With these types of fittings, unless there is a special device allowing it, the removal of the tube from the fitting can either occur accidentally or become impossible without destroying the end of the tube if it is flexible.

In fact, an excessive force exerted on the tube in the direction of its extraction from the fitting, particularly by the pressure of the fluid, may, if the prongs are too flexible, cause them to fold under, allowing the unexpected release of the tube, whether it is flexible or rigid.

One solution to this problem is to make the prongs of a less flexible material. In this case, however, if the tube is flexible there is a risk that the prongs may not only damage it when it is inserted in the fitting by not disengaging sufficiently, but also may tear the tubing by penetrating too deeply into the wall when a force is exerted on it in the direction of its removal from the fitting. If the tube is rigid, its removal is impossible if no device is provided to make it possible.

Patent No. GB 2 060 106 describes a pronged fitting that resolves the problems described above by reducing the risks of the connecting tube being forced out unexpectedly, both by tearing its end if it is flexible and the prongs relatively rigid, as well as by the prongs folding under if they are too flexible.

In this fitting the watertight joint is toric in shape and the ring-shaped pronged member is associated with a ring-shaped support with an approximately L-shaped cross section, having as a result an outer ring of the same outside diameter as the pronged member and an inner tubular part with an inside diameter normally equal to or slightly greater than the outside diameter of the connecting tube. The free edge of this support is oriented toward the prongs of the pronged member for the purpose of limiting, by serving as a backing piece, their swing in the direction of penetration into the wall of the connecting tube.

The tubular portion of the support effectively provides an efficient support for the prongs of the pronged member by preventing their folding under if they are too flexible, or their penetration into the wall of the tube if they are too rigid and the tube is too flexible. Nevertheless, this support plays absolutely no part in retaining the tube within the fitting if the tube is being forced out, and therefore all risks of tearing the tube are not eliminated.

Furthermore, if the pronged fitting is removable, the retaining collar located near the opening of the ring-shaped chamber is mounted axially movable in the direction of the ring-shaped support and the ring-shaped pronged member to allow the prongs to swing away from the wall of the connecting tube, thus effecting its release. The watertight joing located between the retaining collar and the ring-shaped support, and which transmits to the ring-shaped support the axial force from the retaining collar to lift the prongs, is a toric joint.

The toric shape of the watertight joint has two disadvantages: first, of not allowing the release of the tube once it has been inserted, and second, not facilitating the removal of the tube after lifting the prongs of the pronged member by the axial displacement of the retaining collar because, being axially compressed between the support and the retaining collar, its inside diameter tends to decrease, which increases its radial pressure on the tube.

The purpose of the present invention is to rectify simultaneously all these disadvantages. To that end, in the pronged fitting with which this patent is concerned and which is of the type specified above, the inner tubular portion of the support is formed from tabs which are connected to the outer ring by their heel-shaped part curved radially outward.

Thus, when a force is exerted on the tube which would tend to push it out of the fitting, the force applied axially by the prongs on the tabs causes a deformation of the latter which in turn causes a reduction in the diameter of the inner tubular portion of the support, which then tightens on the tube end, with the prongs, helps to retain it within the fitting.

This provision has the effect of reducing the risks of tearing the tube if it is flexible.

In a preferred embodiment of the invention, the ring-shaped watertight joint provided inside the ring-shaped chamber between the ring-shaped pronged member and the retaining collar provided near the opening of the ring-shaped chamber, is a joint with an inner lip radially inclined inward toward the ringshaped pronged member and consequently in the direction of the ring-shaped support.

In addition to its playing a part in the watertightness of the fitting, the lip of this joint, which in no way obstructs the insertion of the tube into the fitting, has the advantage of reinforcing the hold of the tabs which, when they are deformed through the action of the prongs, receive support from the lip. This has a secondary effect of tightening the lip of the joint against the tube, thus improving the watertightness of the fitting.

In addition, in the case of a removable pronged fitting in which the retaining collar placed next to the opening of the circular chamber is mounted axially movable in the direction of the pronged member and of the ring-shaped support to permit the prongs to swing away from the tube to release it, the inner lip of the ring-shaped joint is used to exert the axial force necessary to cause the swinging movement of the prongs, through the tabs of the support.

It has also been shown that in the course of time the wall of the connecting tube, especially if it is flexible, is cur helicoidally by the prongs of the ring-shaped pronged member. This cut is caused by the rotation of the connecting tube inside the fitting to which the pronged member is solidly fixed, such rotation obviously being caused by various movements at the outer end of the connecting tube when it is in use.

Another purpose of the invention is to eliminate this risk. To that effect, is an advantageous embodiment of this fitting, firstly, between the peripheral edge of the outer ring-shaped portion of the pronged member and the outermost inner wall of the corresponding part which houses the ring-shaped chamber, there is a ring-shaped clearance and, secondly, there is an axial clearance between the outer ring-shaped parts of the pronged members and the support to limit the movement of the pronged members from the inner shoulder of the ring-shaped chamber serving as support for it, while permitting its rotation within that chamber.

In any case the invention can be properly understood with the aid of the following description with reference to the drawing attached, which is given as a non-exclusive example, of the pronged fitting:

Figure 1:
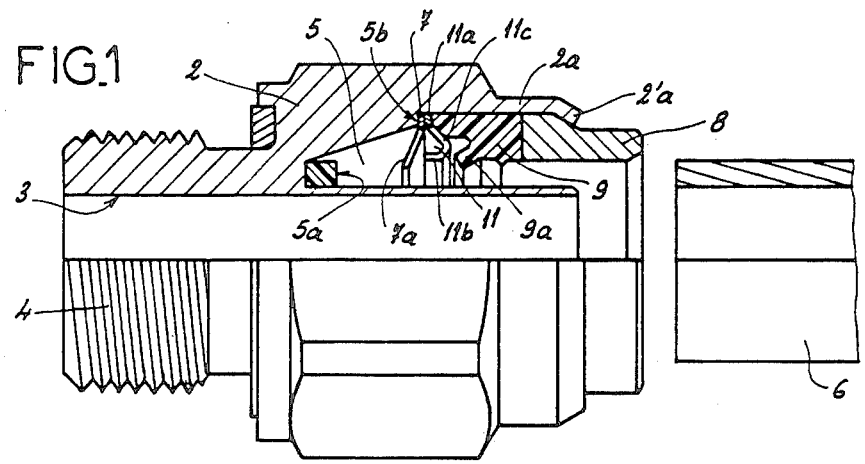
FIG. 1 is a elevational side view with axial half-section showing the fitting before insertion of the connecting tube.

As the drawing shows, this pronged fitting (2), which has a transverse bore (3), has at one of its ends, i.e. the left side of the drawing, a threaded end or nipple (4) to connect it immovably to one of the two parts, not visible in the drawing, which are to be interconnected by the connection tube (6). At the other end, i.e. the right side of the drawing, the fitting has a ring-shaped chamber (5) which is concentric to the bore (3) and whose purpose is to receive and house one of the ends of the connecting tube (60.

Inside the ring-shaped chamber (5), and approximately at its mid-point, is housed an ring-shaped chamber (7), i.e. a ring-shaped part having, along its inner edge, prongs or teeth (7a) which are slightly slanted toward the rear (5a) of the chamber (5) while delimiting an inside diameter which is slightly smaller than the outside diameter of the tube (6).

The ring-shaped pronged member (7) is held against an inner shoulder (5b) of chamber (5) by a collar (8) with the interposition of a watertight joint (9), collar (8) in turn being held in place in fitting (2) by a lip (2'a) on the free end of a part in the shape of a cylindrical skirt (2a) at the end of fitting (2) into which chamber (5) opens.

Between watertight joint (9) and ring-shaped pronged member (7) a ringshaped support is interposed.

According to this invention, this ring-shaped support is composed of an outer ring (11a) of the same outside diameter as the ring-shaped pronged member (7) and an inner tubular part formed by tabs (11b) connected to the ring (11a) by their heel-shaped part (11c) curved radially outward. The inside diameter of the tubular part formed by tabs (11b) of ring-shaped support (11) is selected so that it is equal to or slightly greater than the outside diameter of connecting tube (6). Ring-shaped support (11) is arranged between ring-shaped pronged member (7) and joint (9) in such a way that the free ends of its tabs (11b) are oriented toward prongs (7a) of ring-shaped pronged member (7).

Figure 2:
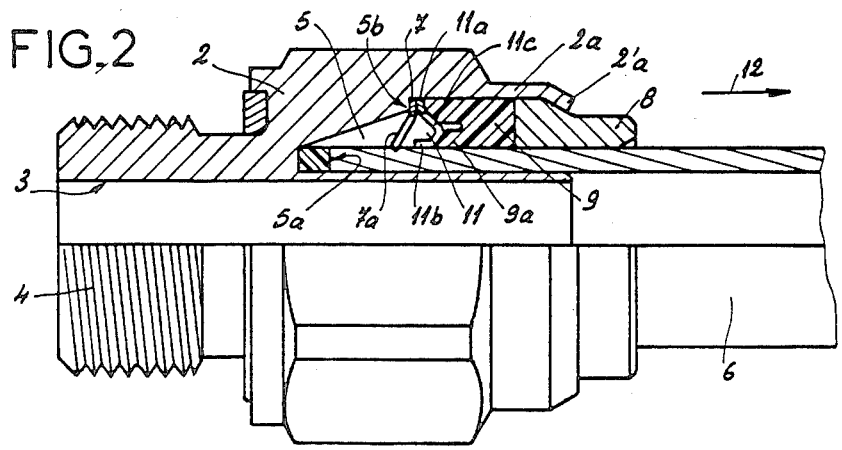
FIG. 2 is similar to FIG. 1, after insertion of the connecting tube.

When fitting (2) is in a neutral position, i.e. before inserting tube (6) into ring-shaped chamber (5), as illustrated in FIG. 1, or, as illustrated in FIG. 2, after the insertion of tube (6) into ring-shaped chamber (5), in the absence of any pull applied to tube (6) in the direction of arrow (12) which is the direction of its removal from fitting (2), the inclination of prongs (7a) toward the rear (5a) of chamber (5) prevents their making contact with the free ends of the tabs (11b) of the ring-shaped support (11).

In these two situations, although ring-shaped support (11) is unnecessary, this is of no consequence since the inside diameter of the tubular part formed by tabs (11b) is equal to or slightly greater than the outside diameter of tube (6). This ring-shaped support (11) does not obstruct the insertion of tube (6) into chamber (5). On the contrary, the primary purpose of this ring-shaped support (11) is to support and consequently to reinforce the prongs (7a) in case an unexpected force is applied to connecting tube (6) in the direction of arrow (12) which would force it out of fitting (2), thus making it possible to use a ring-shaped pronged member (7) provided with very flexible prongs (7a) which would not risk causing any damage to tube (6) when it is inserted into chamber (5).

Figure 3:
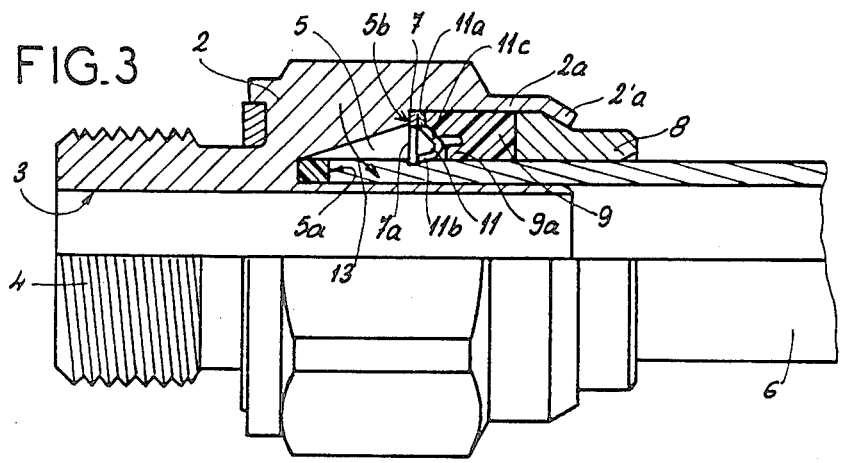
FIG. 3 is similar to FIG. 2 showing the position of the prongs and the tabs when a pull is being applied to the connecting tube in a direction that would force it out of the fitting.

The purpose stated above of ring-shaped support (11) is illustrated by FIG. 3 which shows the position of the members of the pronged fitting when a pulling force is applied to the tube (6) in the direction of arrow (12), i.e. which would force it out of fitting (2), e.g. as a result of high pressure in connecting tube (6).

It can easily be seen that in this case tube (6) undergoes a slight displacement in the direction of arrow (12), this displacement being made possible by the swing of prongs (7a) of the ring-shaped pronged member (7) in the direction of arrow (13) but, as shown in FIG. 3, this swing is limited to a tolerable amount by the presence of the tabs (11b) of ring-shaped support (11) against the free ends of which prongs (7a) are supported. This limitation of the swing of prongs (7a) in the direction of arrow (13) prevents their folding under and limits their penetration into the wall of connecting tube (6), thus eliminating any risk of tearing the wall.

As indicated above, tabs (11b) may be of sufficient rigidity to assure their performing as a support since, when they are in a neutral position they do not in any way obstruct the insertion of tube (6) into chamber (5). However, when a force is exerted axially against them by prongs (7a), they can undergo a slight elastic deformation as they also swing in the direction of arrow (13), the effect of which is to decrease the inside diameter of the tubular part that they form in member (11) and, consequently, to tighten this tubular part against the outer face of the wall of tube (6). The effect of this tightening is that support member (11) participates in retaining tube (6) within fitting (2) by easing the strain on prongs (7a) and thus diminishing the risk of tearing the outer wall of tube (6).

In the example illustrated in the drawing, watertight joint (9) is of the type having an inner lip (9a), since this type is more advantageous in this application than a simple toric joint because tabs (11b) of the ring-shaped support can contribute to improved watertightness when they are deformed and their heel-shaped part (11c) acts against the edge of lip (9a) of joint (9).

In fact, the deformation of tabs (11b) resulting in a reduction of the inside diameter of the tubular part of ring-shaped support (11) also has the effect of exerting on internal lip (9a) of watertight joint (9) a pressure directed radially inward, thus forcing the lip against the wall of tube (6) and improving the watertight characteristics of the fitting.

Figure 4:
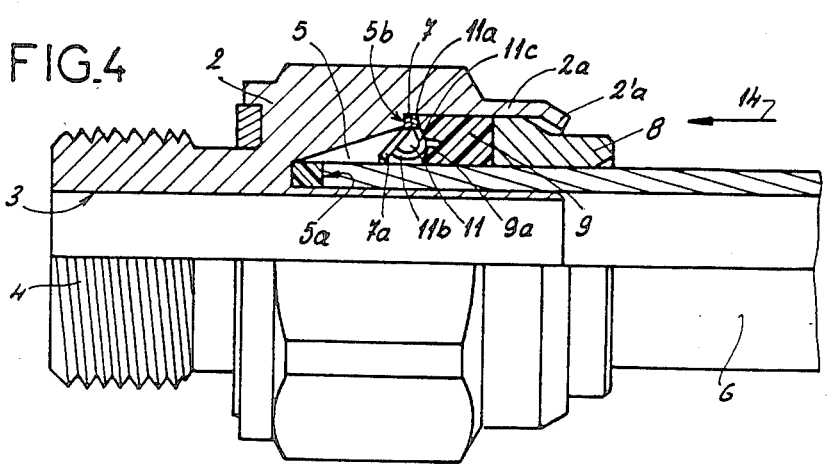
FIG. 4 is similar to FIG. 2, showing the mode of use of the fitting after removal of the connecting tube.

As is evident from the drawing, and more particularly from FIG. 4, in the pronged fitting just described collar (8), retained by lip (2'a), can be axially displaced in the direction of arrow (14), opposite to the direction of arrow (12), i.e. in the direction of ring-shaped members (7) and (11). This displacement is made possble by the possibilities of deformation of watertight joint (9).

The purpose of the movability of collar (8) in the direction of arrow (14) is to make it possible to control, from outside of fitting (2), the swing of prongs (7a) to disengage them from tube (6), i.e. in the opposite direction of arrow (13).

It was previously indicated that watertight joint (9) has the advantage of being the type with an inner lip (9a). This characteristic is also useful for facilitating the disengagement of prongs (7a). In effect, the presence of lip (9a) is taken advantage of by exerting an axial force on heel-shaped parts (11c) of tabs (11b) in the direction of arrow (14) until, as a result of their deformation, they lift the prongs (7a) as illustrated in FIG. 4.

Figure 5:
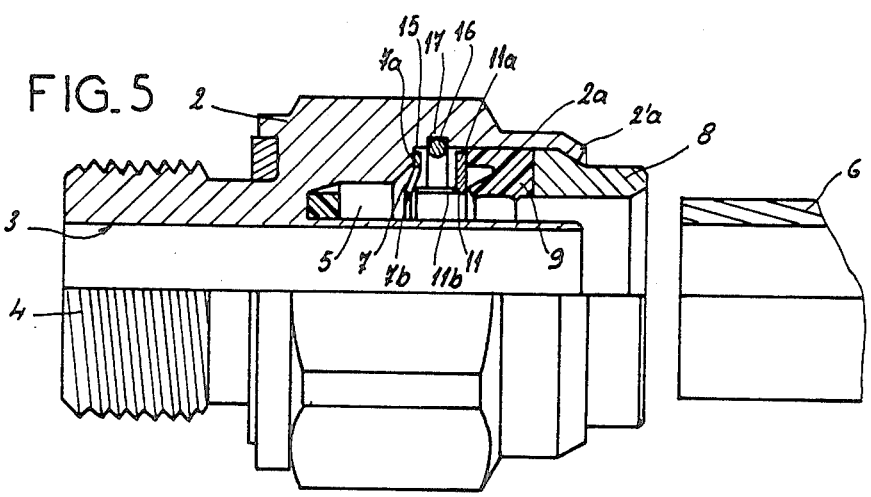
FIG. 5 is similar to FIG. 1, showing a variation of embodiment of the fitting.
Figure 6:
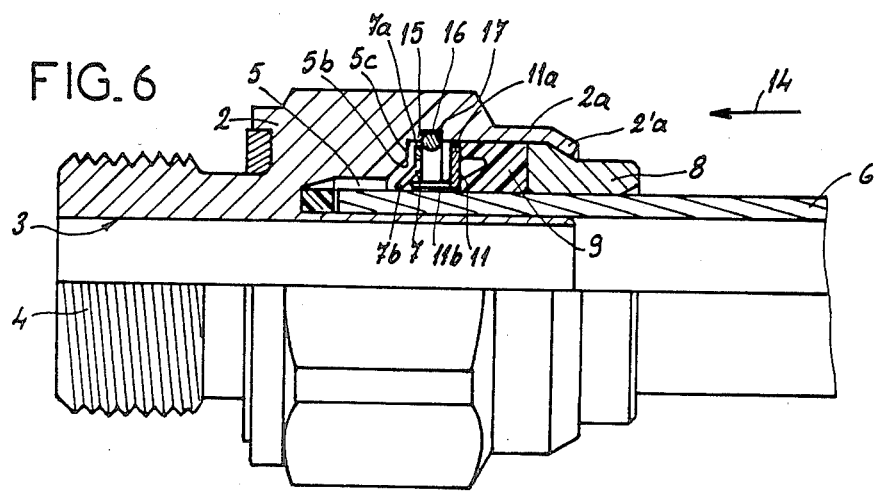
FIG. 6 is similar to FIG. 2 showing the FIG. 5 fitting after the insertion of the connecting tube.

FIGS. 5 and 6 illustrate a variation of this pronged fitting in which it is so arranged that when the connecting tube is rotated inside the fitting while the fitting and ring-shaped pronged member (7a) contained therein are rotationally immobile, prongs (7a) of pronged member (7) are prevented from causing a helicoidal cut in the wall of the connecting tube (6) which would result in tube (6) being disconnected from the fitting.

In FIGS. 5 and 6, those parts that are unchanged are designated by the same reference numbers.

In this new embodiment, it can be noted that the outside diameter of the ring-shaped part of pronged member (7) is smaller than that of the corresponding part (5c) of ring-shaped chamber (5) which houses it, thus providing between the outer wall of ring-shaped chamber (5) and the ring-shaped part of pronged member (7), a peripheral clearance (15) permitting the free rotation of pronged member (7) within ring-shaped chamber (5) with respect to fitting (2).

In addition, to ensure that pronged member (7) is constantly supported, at least by its ring-shaped part, against ring (11a) of ring-shaped support (11), which would limit its free rotation within fitting (2) because support (11) is itself supported by toric watertight joint (9), it is provided with an axial stop limiting the movement of support of pronged member (7) from shoulder (5b) provided in ring-shaped chamber (5), particularly when a pulling force is exerted on connecting tube (6) in such a direction that would tend to extract it from fitting (2), i.e. in the opposite direction of arrow (14).

In this example, the axial stop mentioned above is composed of a cast retainer ring (16) partially housed in recess (17) provided for that purpose in the outer wall of ring-shaped chamber (5).

The permanent axial clearance provided between shoulder (5b) and stop (16) is also for the purpose of permitting the free rotation of pronged member (7) inside fitting (2). Also, if while in use connecting tube (6) is subjected, at its free end (not visible in the drawing) to movements which would tend to rotate the end that is visible in the drawing inside fitting (2), pronged member (7) can then freely turn with it without risking damage to the wall or cutting a helicoidal groove which would cause the disconnection of tube (6) from pronged member (7) and consequently from fitting (2).

As is shown in FIG. 6, in a normal position of use and in the absence of excessive pressure which would tend to cause tube (6) to disengage, pronged member (7), prongs (7a) of which are lightly pressed into the wall of the tube (6), is supported by the outer edge of its ring-shaped part against ring-shaped stop (16) and this support is normally not sufficient to oppose the free rotation of pronged member (7) with tube (6) inside fitting (2).

In order to remove tube (6) from fitting (2), all that is required is to proceed with this fitting in the same way as with the fitting in FIGS. 1 to 4, i.e. moving the retaining collar (8) in the direction of arrow (14).

I claim:

1. A grap ring fitting for a flexible connecting tube and the like, comprising
   a body having a through bore,
   a coaxial chamber open at the forward end of said body,
   connecting means at the rear end of said body,
   a retaining collar partially closing the entrance of said chamber,
   an annular seal in said chamber adjacent said retaining collar,
   a grab ring adjacent a shoulder in said chamber, said grab ring having an outer ring portion and a plurality of prongs inclined toward the rear of said chamber and projecting radially inwardly, defining an inside diameter normally smaller than the outside diameter of the connecting tube,
   a support ring positioned between said grab ring and said seal, said support ring having an outer ring portion and a generally tubular part having an inside diameter for closely receiving the connecting tube, said tubular inner part comprising a plurality of tabs extending rearwardly, having free edges adjacent said prongs for supporting said prongs and limiting their forward movement to resist pull out of said connecting tube.

2. The fitting set forth in claim 1 wherein said annular seal is a lip seal having an inner lip inclined rearwardly and radially inwardly and which is engageable with said support ring upon insertion of the connecting tube.

3. The fitting set forth in claim 2 wherein said support ring further comprises an outwardly curved heel-shaped part between its said outer ring portion and said tabs, said heel-shaped part being engageable with said inner lip of said lip seal upon insertion of the connecting tube.

4. The fitting set forth in claim 1 further comprising a retaining ring disposed in a groove in said chamber between said grab ring and said support ring for limiting forward movement of said grab ring, said grab ring and said support ring being rotatable in said chamber.

5. The fitting set forth in claim 4 wherein said retaining ring is a cast retaining ring.

6. The fitting set forth in any one of claims 1, 2, 3, 4 or 5 wherein said retaining collar is axially slidable rearwardly of said fitting to force said annular seal against said support ring and to thereby force said tabs of said support ring against said prongs of said grab ring to urge said prongs rearwardly out of engagement with the connecting tube.

* * * * *